June 11, 1968 C. B. GENTLE, JR 3,388,234
RESISTANCE WELDING TIP

Filed Jan. 7, 1965 2 Sheets-Sheet 1

INVENTOR.
CECIL B. GENTLE, JR.
BY
ATTORNEYS

June 11, 1968  C. B. GENTLE, JR  3,388,234
RESISTANCE WELDING TIP

Filed Jan. 7, 1965  2 Sheets-Sheet 2

INVENTOR.
CECIL B. GENTLE, JR.

BY

ATTORNEYS

United States Patent Office 3,388,234
Patented June 11, 1968

3,388,234
RESISTANCE WELDING TIP
Cecil B. Gentle, Jr., 2007 Vanderbilt Drive SW.,
Huntsville, Ala. 35801
Filed Jan. 7, 1965, Ser. No. 424,154
3 Claims. (Cl. 219—119)

ABSTRACT OF THE DISCLOSURE

A resistance welding electrode includes a hollow tip having an end recess for accommodating an object to be secured to a weldment. In one embodiment, the tip has a hollow chamber containing either an electromagnet or a permanent magnet so that the object is held within the recess by magnetic attraction during the welding operation. In another embodiment the tip has a bore which communicates with a vacuum producing source so that the object will be securely held within the recess due to the pressure difference that is created.

---

The invention described herein may be manufactured and used by or for the Government of the United States of America for governmental purposes without the payment of any royalties thereon or therefor.

This invention relates generally to a resistance welding tip and more particularly relates to a resistance welding tip having magnetic or vacuum devices incorporated therein for the purpose of holding objects to be secured by welding to a weldment.

It has long been recognized that the process of welding is an extremely satisfactory manner of joining a plurality of objects together. Some difficulty has been encountered, however, where one or more of the objects to be joined is small, especially where accurate placement of the object is a desired end. For example, in the construction of wind tunnel models of space vehicles, small scale, extremely thin fins and wind break balls having a diameter of .005 to 0.25 inch are secured to the body of the model to give realism to the tests.

Heretofore, the small fins and balls were held by tweezers while being soldered or otherwise secured to the body of the model. Such is a very tedious, time consuming process and usually results in inaccurate positioning. Since accurate placement is a prerequisite for realistic testing, models on which the fins and balls are not located at the desired point within permissable tolerances must be rejected and usually scrapped.

According to the present invention it has now been found that the aforesaid difficulties may be overcome by providing a magnetic or vacuum holding device within the tip of a resistance welding electrode. The electrode tip is shaped so as to accomodate at least a portion of the object to be secured to the weldment in order that it may be held firmly in the desired position. Support is provided for the electrode so that it is maintained fixed in two planes relative to the spot on the weldment at which it is desired to secure the object.

The object is then placed on the electrode tip and by virtue of the magnetic or vacuum system securely held thereto. The electrode is then moved to the preselected spot on the weldment, which is also held in a fixed position, a current is passed through the electrode, the object to be secured, and the weldment. As is well known in the art of resistance welding, a hot spot will occur at the point at which the object to be secured and the weldment touch one another causing fusion of the metals of these objects.

Obviously, the apparatus described above will produce a result vastly superior to that obtainable in utilizing a hold and solder technique. The resulting joint is stronger and the placement is accurate to a much greater degree than that heretofore possible.

Accordingly it is an object of this invention to provide a method and apparatus for fusion welding small objects to a weldment.

It is another object of this invention to provide apparatus including a resistance welding electrode having a holding device disposed therein so that small objects may be accurately secured to a weldment.

It is yet another object of this invention to provide a resistance welding electrode having a hollowed out tip portion with a magnetic or vacuum holding system disposed therein so that small objects may be held thereto while being fusion welded to a weldment.

Still a further object of this invention is to provide a method and apparatus for securing small objects, such as fins and wind-breaker balls, to a wind tunnel model so that the placement is accurate and the joint is strong.

These and other objects and advantage of this invention will be more apparent upon reference to the following specification, appended claims, and drawings wherein:

Figure 2:
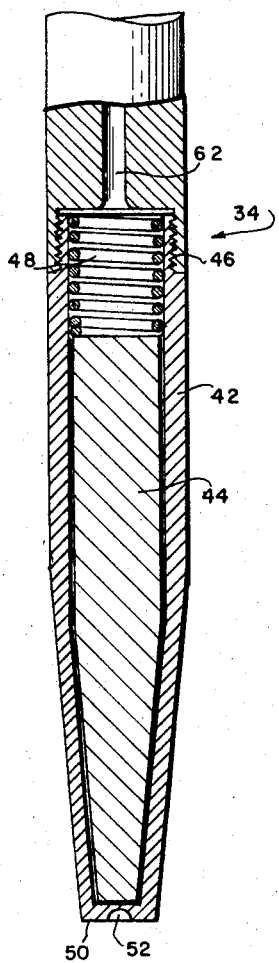
FIGURE 2 is an enlarged sectional view of the resistance welding electrode shown in FIGURE 1 having a permanent magnet secured in the hollowed out tip portion thereof for holding an object while it is being welded to a weldment.
Figure 3:
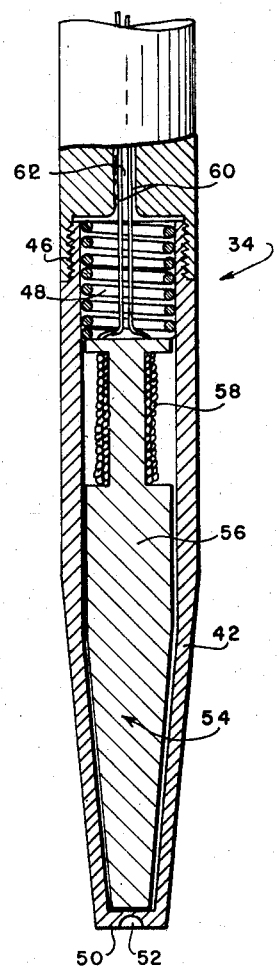
Figure 4:
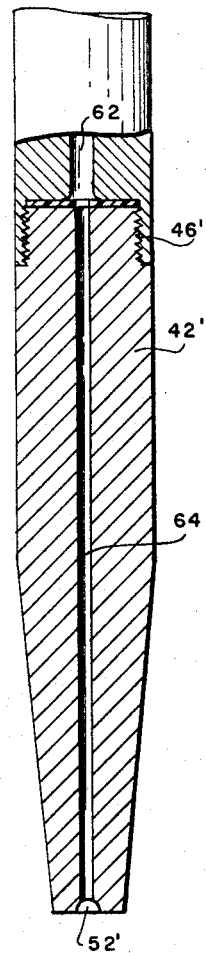

FIGURE 3 is a view similar to FIGURE 2 but illustrating another embodiment of the invention in which an electromagnet is disposed within the hollowed out tip of the electrode as a holding device; and FIGURE 4 is another view similar to FIGURE 2 in which the tip of the electrode and the body of the electrode each include a hollowed out passageway adapted to be connected to a source of vacuum to create an object holding force at the outer end of the tip.

In order to better understand the construction and use of this novel welding device, it will be described in connection with the securing of small objects to a wind tunnel model. It is to be understood, however, that various other uses may be found for this novel device. For example, an electrode constructed in accordance with this invention will give superior results when used in welding small objects within the mechanism of watches, precision instruments, gyroscopes, or other assorted equipment. Other uses will be readily apparent to those skilled in the art.

Figure 1:
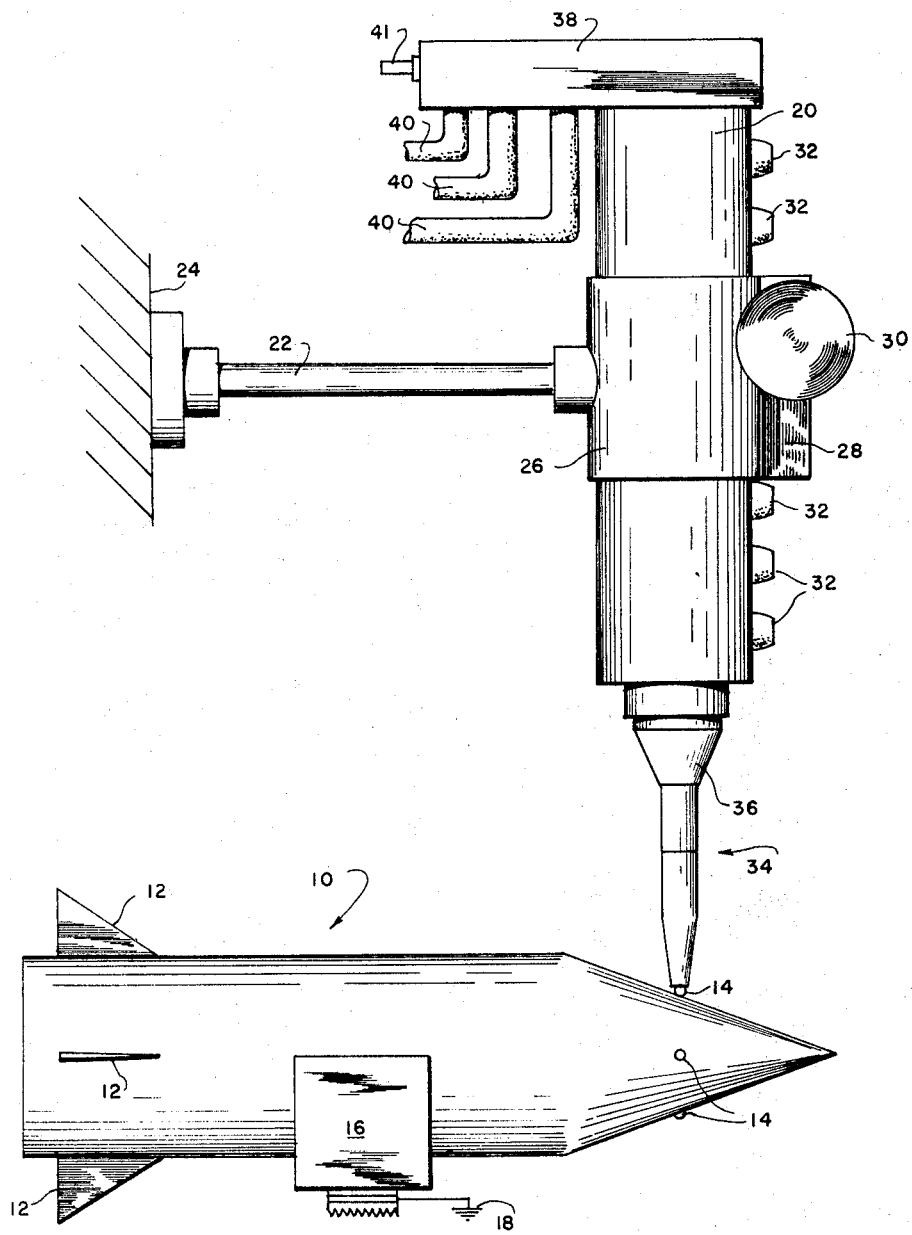
FIGURE 1 is a side view of a resistance welding device having an electrode according to the instant invention holding a small wind-breaker ball which is to be welded to a wind tunnel testing model in a correct and accurate position.

With continued reference to the accompanying figures wherein like numerals designate similar parts through the various views and with initial attention directed to FIGURE 1, reference numeral 10 designates a model which is to be tested in a wind tunnel. To obtain realism in the test, a plurality of small thin fins 12 and small windbreaker balls 14 must be secured to the body of the model. In order to perform such an operation, the model is securely held by an adjustable clamp 16 which is grounded as shown at 18. An adjustable welding barrel 20 is maintained at a position above the adjustable clamp 16 by arm 22 which is secured to a supporting member 24. The barrel 20 is slidable within a collar 26 secured to the outer end of the arm 22 and including an outwardly struck portion 28. Supported by the outwardly struck portion is a shaft and gear arrangement (not shown) which are rotatable by means of knob 30. A plurality of gear teeth 32 are disposed along the side of the barrel 20 so as to be engageable with the aforesaid gear. Sufficient clearance between the gear teeth 32 and the collar 26 is provided by the struck out portion 28 so that the barrel may be moved in a vertical plane by rotation of the knob 30.

A welding electrode 34 is secured to the lower end of the barrel 20 by means of an insulated collet 36. The electrode 34 extends upward through the interior of the barrel 20 and into a cap 38 which is secured to the upper end of the barrel. Within the cap 38 connection between the electrode 34 and the power supply wires 40 is accomplished. Also provided on the cap 38 is a section of pipe 41 to provide communication between the electrode 34 and a source of vacuum for a purpose to be hereinafter described.

In the embodiment of the invention illustrated in FIGURE 2, the electrode includes a hollowed out tip portion 42 within which is disposed a permanent magnet 44. The tip 42 is threaded to the body of the electrode 34 as shown at 45 and contains a hold down spring 48 which reacts between the body of the electrode 34 and the permanent magnet 44 to maintain the latter in a fixed position. The tip portion 42 is tapered to terminate in a lower flat portion 50 having a spherical cut out 52 which, as illustrated, is of such a size as to accommodate a ball 14.

Of course, the cut out 52 can be shaped in size and configuration to accommodate any object which is to be secured to the model 10. Balls of different diameters would require tips 42 having a cut out 52 shaped to accommodate that particular size. Further, the cut out can be in the shape of a slot to accommodate a fin such as that shown at 12 on the model 10.

In FIGURE 3 an embodiment of the invention is illustrated in which the hollowed out tip portion 42 of the electrode 34 contains an electromagnet 54. A magnetic field is created, in a well known manner, within the core 56 of the electromagnet 54 when current is passed through the windings 58. Current is supplied to the windings 58 through wires 60 which extend from the cap 38 through a bore 62 within the body of the electrode 34. Thus, as a ball 14 or other object is placed within the cut out 52, the electromagnet 54 is energized to hold it firmly while it is being secured to the weldment.

In the embodiment of the invention illustrated in FIGURE 4 the holding system consists of a source of vacuum which is applied to the cut out portion 52 through a bore 62 in the body of the electrode and a bore 64 in the electrode tip 42. The electrode is suitably connected to a source of vacuum through the pipe section 41 extending outwardly from the cap 38. Thus, a ball 14 or other object will be securely held within the cut out due to the differential in pressure between the atmosphere surrounding the tip portion 42 and the evacuated bore 64.

The operation of the device illustrated in FIGURE 1 is substantially the same no matter whether the tip illustrated in FIGURE 2, FIGURE 3, or FIGURE 4 is utilized. The model 10 is securely held in a predetermined position by the clamp 16. This position is calculated so that as the barrel 20 is lowered it will spot the ball 14, fin 12, or other object at the desired point on the model 10. The object to be welded is placed on the flat tip portion 50 and received within the suitably shaped cut out and held there by the action of the permanent magnet 44, the electromagnet 54, or by the action of the pressure differential created in the embodiment illustrated in FIGURE 4. The barrel 20 is then lowered until the ball 14, fin 12, or other object touches the model 10. Current is then applied to the electrode 34 to pass through the ball 14, the model 10, clamp 16, and to complete the circuit to ground 18. Passing the current through these elements will, as is well known in the resistance welding art, produce a hot spot between the object being held and the model 10 and cause fusion between the materials from which those elements are fabricated.

It will be apparent that by utilizing the teachings contained in the foregoing description that a novel device for welding small objects to a weldment may be produced. Thus, the well known benefits of a welding process may be utilized in such situations where heretofore it has not been possible. Futhermore, the small objects may be placed at a point on the weldment with an accuracy which is limited more by the reliability of the gauges utilized than by the welding process itself. It is thus now feasible to do quickly, accurately, and more securely a job which formerly was at the best a hit and miss proposition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency with the claims are therefore intended to be embraced therein.

What is claimed and desired to be secured by United States Letters Patent is:

1. An electrode for a resistance welding device which is especially adapted for securing small objects to a weldment comprising:

an elongated body portion having a lower end, said body portion being adapted to be connected to a source of electric current;

an elongated tip having an upper and a lower end with an opening extending from said upper end and terminating adjacent the lower end so as to form a hollow chamber;

said elongated tip having its upper end threadedly connected to the lower end of said body portion;

said lower end of said elongated tip being flat and having a shallow recess therein;

said body portion and said elongated tip being made of electrically conductive material;

a magnet means disposed within said hollow chamber of said elongated tip for magnetically holding a small object to be secured to a weldment partially within said shallow recess;

a spring means within said hollow chamber of said elongated tip and extending between said magnet means and said body portion to maintain said magnet means against the lower end of said hollow chamber.

2. An electrode as defined by claim 1 wherein said magnet means is a permanent magnet.

3. An electrode as defined by claim 1 wherein said magnet means is an electromagnet.

References Cited

UNITED STATES PATENTS

| | | | |
|---|---|---|---|
| 2,110,832 | 3/1938 | Hogg et al. | 219—98 |
| 3,182,880 | 5/1965 | Heldenbrand | 219—159 X |
| 1,449,369 | 3/1923 | Anderson. | |
| 1,857,115 | 5/1932 | Crawford. | |
| 1,956,840 | 5/1934 | Walmsley. | |
| 2,443,582 | 6/1948 | Lendo et al. | |
| 2,467,636 | 4/1949 | Stoudt et al. | |
| 2,967,228 | 1/1961 | Tindall. | |
| 2,991,347 | 7/1961 | Weinstein. | |
| 3,037,108 | 5/1962 | Porllevey. | |

FOREIGN PATENTS

| | | |
|---|---|---|
| 965,508 | 2/1950 | France. |
| 923,207 | 2/1955 | Germany. |

RICHARD M. WOOD, *Primary Examiner.*

J. G. SMITH, *Assistant Examiner.*